US010328610B2

(12) United States Patent
Ahmed et al.

(10) Patent No.: US 10,328,610 B2
(45) Date of Patent: Jun. 25, 2019

(54) METHOD OF RECYCLING CARBON FIBER PREPREG WASTE

(71) Applicant: UNITED ARAB EMIRATES UNIVERSITY, Al Ain (AE)

(72) Inventors: Waleed K. Ahmed, Al Ain (AE); Ali Hilal-Alnaqbi, Al Ain (AE); Aamna Salem Saeed Almazrouei, Al Ain (AE); Lamia Aziz Alh Mohamed Almarzooqi, Al Ain (AE); Dina Al Jamal, Al Ain (AE); Farah Ashraf Ahmed Genena, Al Ain (AE)

(73) Assignee: United Arab Emirates University, Al-Ain (AE)

(*) Notice: Subject to any disclaimer, the term of this patent is extended or adjusted under 35 U.S.C. 154(b) by 82 days.

(21) Appl. No.: 15/680,981

(22) Filed: Aug. 18, 2017

(65) Prior Publication Data
US 2019/0054662 A1 Feb. 21, 2019

(51) Int. Cl.
B29B 17/00 (2006.01)
B29K 105/08 (2006.01)
B29K 105/26 (2006.01)
B29C 48/00 (2019.01)
B29K 105/24 (2006.01)

(52) U.S. Cl.
CPC ...... B29B 17/0042 (2013.01); B29B 17/0005 (2013.01); B29C 48/0011 (2019.02); *B29K 2105/0872* (2013.01); *B29K 2105/246* (2013.01); *B29K 2105/26* (2013.01)

(58) Field of Classification Search
None
See application file for complete search history.

(56) References Cited

U.S. PATENT DOCUMENTS

| 2008/0289276 | A1  | 11/2008 | Raponi |
|---|---|---|---|
| 2010/0267868 | A1* | 10/2010 | Takahashi ............... B29B 9/14 524/79 |
| 2011/0036481 | A1* | 2/2011 | Inserra Imparato ........ B29B 17/0042 156/94 |
| 2015/0151454 | A1* | 6/2015 | Herrmann ............... B29C 47/12 264/130 |
| 2016/0214278 | A1* | 7/2016 | Dauner ............... B29C 47/0066 |
| 2017/0174860 | A1* | 6/2017 | Witte .................. B29B 17/00 |
| 2018/0229393 | A1* | 8/2018 | Corden ............... B29B 17/0026 |
| 2018/0326678 | A1* | 11/2018 | Villalon ............... B29B 17/0026 |
| 2019/0016016 | A1* | 1/2019 | McKay ............... B29B 17/0005 |

FOREIGN PATENT DOCUMENTS

| EP | 0875452 A2 | 11/1998 |
|---|---|---|
| JP | 10131052 A | 5/1998 |
| RU | 2347791 C1 | 2/2009 |

OTHER PUBLICATIONS

Nilakantan et al., "Reuse and upcycling of aerospace prepreg scrap and waste," Reinforced Plastics, vol. 59, No. 1, Jan./Feb. 2015.

* cited by examiner

*Primary Examiner* — Mary Lynn F Theisen
(74) *Attorney, Agent, or Firm* — Richard C. Litman

(57) ABSTRACT

The method of recycling carbon fiber prepreg waste includes collecting uncured carbon fiber prepreg waste, where the carbon fiber prepreg waste still includes the backing film associated with the carbon fiber prepreg (typically in the form of a colored polyethylene layer). The uncured carbon fiber prepreg waste is then shredded and inserted into either an open or a closed mold. The mold is then inserted into a hot press, where the shredded carbon fiber prepreg waste is cured under selected temperature and pressure for a selected period of time, dependent upon the particular volume of waste and the desired recycled product. Alternatively, the shredded carbon fiber prepreg waste may be rolled in a hot metallic roller or extruded in a hot melt extruder.

5 Claims, No Drawings

METHOD OF RECYCLING CARBON FIBER PREPREG WASTE

BACKGROUND OF THE INVENTION

1. Field of the Invention

The present invention relates to recycling of waste materials, and particularly to a method of recycling carbon fiber prepreg waste which includes a backing film associated with the carbon fiber prepreg.

2. Description of the Related Art

Reinforcing fabrics which have been pre-impregnated with resin are commonly referred to as "prepregs". Prepregs are used in a large number of different industries, with over ten million tons of prepregs being manufactured each year. Approximately 20% of all prepreg production goes to the aerospace industry, particularly in the form of carbon fiber prepregs. Since prepregs are fabrics, which must be cut or shaped for their particular applications, large amounts of prepreg waste are produced in the form of offcuts, scrap and defective material. Adding to the waste, prepregs are typically sold and transported with peel-off, protective backing layers. Thus, the waste not only includes the prepreg material itself, but the additional backing material, which is commonly manufactured from dyed or otherwise colored polyethylene.

Uncured carbon fiber prepreg scrap is primarily generated during ply cutting operations or is in the form of expired prepreg or prepreg beyond its recommended lifetime or freezer life. In the former case, the scrap waste is typically in the form of very small, randomly sized and shaped pieces, making it highly impractical to remove the backing films for proper recycling. In the latter case, expired materials are often seen as undesirable for recycling purposes, so such waste is either directly disposed of in landfills or donated in whole condition to research universities for research and development purposes. Following research and development, the scrap is often disposed of, once again, by directly depositing it in landfills. It would be desirable to be able to recycle uncured carbon fiber prepreg easily, without the difficulties of first removing the backing films. Thus, a method of recycling carbon fiber prepreg waste solving the aforementioned problems is desired.

SUMMARY OF THE INVENTION

The method of recycling carbon fiber prepreg waste includes transforming carbon fiber prepreg waste, such as offcuts, scrap, defective material and the like, into colored, non-structural elements, such as flat panels or elements having desired sizes and shapes. The carbon fiber prepreg waste can be uncured and can include the backing film associated with the carbon fiber prepreg (typically in the form of a colored polyethylene layer). The carbon fiber prepreg waste is first collected, then shredded and inserted into either an open or a closed mold. The carbon fiber prepreg waste is then inserted into a hot press, where the shredded carbon fiber prepreg waste is cured under selected temperature and pressure for a selected period of time, dependent upon the particular volume of waste and the desired recycled product. Alternatively, the shredded carbon fiber prepreg waste may be rolled in a hot metallic roller to produce the recycled panel. As a further alternative, the shredded carbon fiber prepreg waste may be extruded in a hot melt extruder to produce a recycled element.

These and other features of the present invention will become readily apparent upon further review of the following specification.

DETAILED DESCRIPTION OF THE PREFERRED EMBODIMENTS

The method of recycling carbon fiber prepreg waste includes recycling carbon fiber prepreg waste, such as offcuts, scrap, defective material and the like, into colored, non-structural elements, such as flat panels. Uncured carbon fiber prepreg waste is first collected, where the carbon fiber prepreg waste still includes the backing film associated with the carbon fiber prepreg (typically in the form of a colored polyethylene layer). The uncured carbon fiber prepreg waste is then shredded and inserted into either an open or a closed mold. The mold is then inserted into a hot press, where the shredded carbon fiber prepreg waste is cured under selected temperature and pressure for a selected period of time, dependent upon the particular volume of waste and the desired recycled product. Alternatively, the shredded carbon fiber prepreg waste may be rolled in a hot metallic roller to produce the recycled panel. As a further alternative, the shredded carbon fiber prepreg waste may be extruded in a hot melt extruder to produce a recycled element. The recycled prepreg waste can be used as sustainable non-structural elements for subsidiary applications relating to construction or aerospace, for example.

In an example of hot press curing using an open mold, an open square mold with 25 inch sides was filled with shredded carbon fiber prepreg waste (including the associated colored polyethylene backing material). The shredded carbon fiber prepreg waste was held in the mold between two aluminum foil layers which had been coated with a thin industrial wax, which is commonly used as a mold release agent. The hot press was heated for 30 minutes to a temperature of 100° F. to provide ample time for the mold to absorb the heat. Then, the mold was heated in the press at 270° F., under a pressure of 1500 lbs., for a period of 30 minutes. After 30 minutes, the pressure was released and the hot press heater was switched off. The mold was removed from the hot press and left to cool to room temperature. The aluminum foil films were removed, yielding a colored panel of recycled carbon fiber prepreg waste.

As noted above, alternatively, a closed mold may be used. For example, a typical two-piece, metallic mold can be used to produce a recycled product having a desired size and shape. The shredded carbon fiber prepreg waste can be added to the mold and the mold can then be inserted in the hot press. The temperature, pressure and time can be selected dependent upon the volume of waste used, as well as the particular recycled element being produced.

As a further alternative, as noted above, the shredded carbon fiber prepreg waste can be rolled using a hot metallic roller. Again, the temperature, pressure and time can be selected dependent upon the volume and type of waste used, as well as the particular dimensions of the recycled panel being produced. The roller would allow for production of a continuous sheet or the like. Additionally, a recycled element can be produced by forcing the shredded carbon fiber prepreg waste into a hot melt extruder. Here, the temperature of the hot melt extruder's heaters may be selected, as well as the pressure produced by the extruder screw(s). The temperature and pressure can be selected dependent upon the volume and type of waste used, as well as the particular size and shape of the recycled element being produced.

It is to be understood that the present invention is not limited to the embodiments described above, but encompasses any and all embodiments within the scope of the following claims.

We claim:

1. A method of recycling carbon fiber prepreg waste, comprising the steps of:

shredding a volume of carbon fiber prepreg waste, wherein the carbon fiber prepreg waste includes a backing film associated with the carbon fiber prepreg;

providing a mold, wherein the mold has interior surfaces adapted to receive the the volume of carbon fiber prepreg waste;

lining the interior mold surfaces with a release agent;

filling the mold with the shredded volume of carbon fiber prepreg waste;

providing a hot press;

heating the hot press for 30 minutes at 100° F.;

inserting the mold into the hot press;

curing the shredded volume of carbon fiber prepreg waste in the hot press to produce a recycled element, wherein the curing is at a predetermined pressure and at a temperature of 270° F. and for 30 minutes; and removing the mold from the hot press and letting it cool at room temperature.

2. The method of recycling carbon fiber prepreg waste as recited in claim 1, wherein the step of filling the mold with the shredded volume of carbon fiber prepreg waste comprises filling an open mold with the shredded volume of carbon fiber prepreg waste.

3. The method of recycling carbon fiber prepreg waste as recited in claim 1, wherein the predetermined pressure is 1500 lbs.

4. The method of recycling carbon fiber prepreg waste as recited in claim 1, wherein the step of filling the mold with the shredded volume of carbon fiber prepreg waste comprises filling a closed mold with the shredded volume of carbon fiber prepreg waste.

5. The method of recycling carbon fiber prepreg waste as recited in claim 1, wherein the release agent is wax coated aluminum foil.

\* \* \* \* \*